(12) United States Patent
Tokumoto

(10) Patent No.: US 7,275,619 B2
(45) Date of Patent: Oct. 2, 2007

(54) ELECTRIC POWER STEERING SYSTEM

(75) Inventor: Yoshitomo Tokumoto, Nabari (JP)

(73) Assignee: Koyo Seiko Co., Ltd., Osaka (JP)

( * ) Notice: Subject to any disclaimer, the term of this patent is extended or adjusted under 35 U.S.C. 154(b) by 267 days.

(21) Appl. No.: 11/017,729

(22) Filed: Dec. 22, 2004

(65) Prior Publication Data

US 2005/0150712 A1    Jul. 14, 2005

(30) Foreign Application Priority Data

Dec. 25, 2003   (JP)   ............... 2003-430160

(51) Int. Cl.
 *B60D 1/44*    (2006.01)
(52) U.S. Cl. .................... 180/446; 701/40
(58) Field of Classification Search ............ 180/443, 180/444, 446, 41–43; 701/41–43
See application file for complete search history.

(56) References Cited

U.S. PATENT DOCUMENTS

| | | | | |
|---|---|---|---|---|
| 6,364,051 B1 * | 4/2002 | Kada et al. | ............ | 180/446 |
| 6,691,820 B2 * | 2/2004 | Tokumoto | ............ | 180/446 |
| 6,865,463 B2 * | 3/2005 | Suzuki | ............ | 701/43 |
| 6,889,794 B2 * | 5/2005 | Higashira et al. | ............ | 180/444 |
| 6,948,385 B2 * | 9/2005 | Tokumoto et al. | ............ | 73/862.334 |

FOREIGN PATENT DOCUMENTS

JP    2000-185660 A    7/2000

* cited by examiner

*Primary Examiner*—Lesley D. Morris
*Assistant Examiner*—Maurice Williams
(74) *Attorney, Agent, or Firm*—Birch, Stewart, Kolasch & Birch, LLP

(57) ABSTRACT

An electric power steering system includes: a first rotation detection section including a first sensor section and outputting a signal corresponding to a rotation of an input shaft; a second rotation detection section including second and third sensor sections and outputting signals corresponding to a rotation of an output shaft; and a control unit detecting the respective rotational angles of the input and output shafts and a torque applied to a torsion bar based on the output signals from these rotation detection sections, and providing a driving control of an electric motor. The control unit makes determination on the occurrence of failure at the first to third sensor sections, and provides the driving control of the electric motor as shifting the driving control, based on results of the determination, between a torque control mode using the detected value of the torque and a steering angle control mode using the detected value of the rotational angle of either one of the input and output shafts.

9 Claims, 8 Drawing Sheets

ELECTRIC POWER STEERING SYSTEM

FIELD OF THE INVENTION

The present invention relates to an electric power steering system which is mounted in a vehicle such as automotive vehicles and which employs an electric motor for assisting a driver in steering operation.

DESCRIPTION OF THE PRIOR ART

An electric power steering system mounted in an automobile, for example, includes an electric motor coupled to a steering mechanism extended from a steering member (handle) to steerable road wheels. The electric power steering system is adapted to apply a power of the electric motor to the steering mechanism thereby assisting a driver in operating the above steering member for steering operation. The steering mechanism of such a steering system includes a steering shaft which has one end thereof and the other end thereof coupled to the steering member and to the steerable road wheels, respectively, and which rotates in association with the steering operation by the driver. In the electric power steering system, the electric motor is generally driven and controlled based on a torque produced on the steering shaft according to the steering operation.

As disclosed in Japanese Unexamined Patent Publication No.2000-185660, for example, a conventional electric power steering system is provided with a torque sensor for detecting the aforementioned torque, and a steering angle sensor for detecting a rotational angle (steering angle) of the steering shaft, such that after the detection of a failure of the torque sensor, an assist control may be provided based on a detected value of the rotational angle outputted from the steering angle sensor. Thus, the suspension of the steering assist based on the above motor power is prevented even when the torque sensor generates failure.

Specifically, the conventional electric power steering system operates as follows. Before the detection of the failure of the torque sensor, a controller decides a target current value for the electric motor according to a torque detected by the sensor and provides a driving control of the electric motor by way of a feedback control using the target current value thus decided. After the detection of the failure of the torque sensor, the controller provides the driving control of the electric motor based on a steering angle detected by the steering angle sensor, in a manner that the driving control features assist characteristics analogous to those of the control provided prior to the detection of the failure of the torque sensor. In this manner, the conventional electric power steering system keeps providing the steering assist.

However, the conventional electric power steering system as described above has the following problem. When the torque sensor (torque detection section) or the like temporarily sustains a recoverable abnormality and/or failure caused by, for example, external noises, so that the controller becomes unable to acquire the detected value of the torque, the controller detects and determines the torque sensor to be out of order and then is completely shifted to the assist control based on the steering angle. Hence, the controller is not returned to the assist control based on the detected value of the torque even though the torque sensor or the like recovers to normal with the aforementioned temporary abnormality and/or failure eliminated after the controller detects and determines the torque sensor to be out of order. Hence, the controller continues to provide the assist control based on the steering angle.

OBJECT AND SUMMARY OF THE INVENITON

In view of the problems encountered by the conventional electric power steering systems, the present invention has an object to provide an electric power steering system wherein even if an assist control based on a detected value of a torque is suspended due to temporary sensor failure or the like, a controller is adapted to resume the assist control based on the detected value of the torque when the temporary sensor failure or the like is eliminated.

According to the present invention for achieving the above object, an electric power steering system providing a steering assist by applying a power of an electric motor to a steering mechanism extended from a steering member to steerable road wheels, the electric power steering system comprises: a first rotary shaft coupled to the steering member; a second rotary shaft connected to the first rotary shaft via a torsion bar; a first rotation detection section comprising one or more detector units for outputting a signal corresponding to a rotation of the first rotary shaft; a second rotation detection section comprising one or more detector units for outputting a signal corresponding to a rotation of the second rotary shaft; and a controller detecting respective rotational angles of the first and second rotary shafts and a torque on the torsion bar based on the output signals from the first and second rotation detection sections, and providing a driving control of the electric motor, and is characterized in that the controller checks each of plural detector units of the first and second rotation detection sections to make determination on the occurrence of a failure based on the output signals thereof, and provides the driving control of the electric motor as shifting the driving control, based on results of the determination, between a torque control mode using a detected value of the torque and a steering angle control mode using a detected value of either one of the rotational angles of the first and second rotary shafts.

According to the electric power steering system arranged as described above, the controller checks each of the plural detector units included in the first and second rotation detection sections to make determination on the occurrence of a failure and then, provides the driving control of the electric motor as shifting the driving control, based on results of the determination, between the torque control mode using the detected value of the torque and the steering angle control mode using the detected value of either one of the rotational angles. Unlike the conventional example, therefore, the electric power steering system affords an advantage that even when an assist control based on the detected value of the torque is suspended due to a temporary failure or the like, the controller detects the occurrence of the temporary failure or the like and the elimination thereof so as to resume the assist control based on the detected value of the torque when the temporary failure or the like is eliminated.

It is further preferred in the above electric power steering system that the controller manages history information on the occurrence of failure with respect to each of the plural detector units, and selects either the torque control mode or the steering angle control mode based on the results of the determination and the history information.

In this case, the controller may use the history information for checking each of the detector units so as to determine a level of a failure thereat. Hence, the controller is capable of selecting a more suitable one of the torque control mode and the steering angle control mode, thereby readily accomplishing the optimization of the assist control.

It is further preferred in the above electric power steering system that when the controller determines that at least one of the detector units of the first rotation detection section is free from failure and that at least one of the detector units of the second rotation detection section is free from failure, the controller carries out the torque control mode in preference to the steering angle control mode.

In this case, when at least one of the detector units of the first and second rotation detection sections sustains a temporary failure or the like but the controller detects the elimination of the temporary failure or the like, the torque control mode featuring a more excellent steering feeling than the steering angle control mode may be immediately carried out in preference to the steering angle control mode. Hence, the electric power steering system may provide an even more suitable assist control thereby readily obviating the impairment of steerability of a vehicle.

According to the above electric power steering system, the controller may comprise a plurality of processors for calculating the respective rotational angles of the first and second rotary shafts and the torque based on a predetermined operation equation using the output signals from the first and second rotation detection sections; the controller may compare the corresponding rotational angles with each other and the corresponding torques with each other, the rotational angles and torques calculated by each of the processors; and the controller may selectively carry out either the torque control mode or the steering angle control mode according to comparison results.

In this case, the controller may suitably carry out either the torque control mode or the steering angle control mode, thus further enhanced in reliability.

According to the above electric power steering system, the plurality of the processors may calculate the corresponding rotational angles and the corresponding torques using individually different operation equations.

In this case, the plurality of the processors use the individually different operation equations and hence, the plurality of the processors are more likely to provide different operation results in the event of a failure or the like. Therefore, the detection of the failure or the like is facilitated as compared with a case where the plurality of the processors use the same operation equation. This provides for an even more suitable selection of the torque control mode or the steering angle control mode, so that the controller may be enhanced in the reliability even further.

DESCRIPTION OF THE PREFERRED EMBODIMETNS

An electric power steering system according to a preferred embodiment of the invention will hereinbelow be described with reference to the accompanying drawings.

Figure 1:
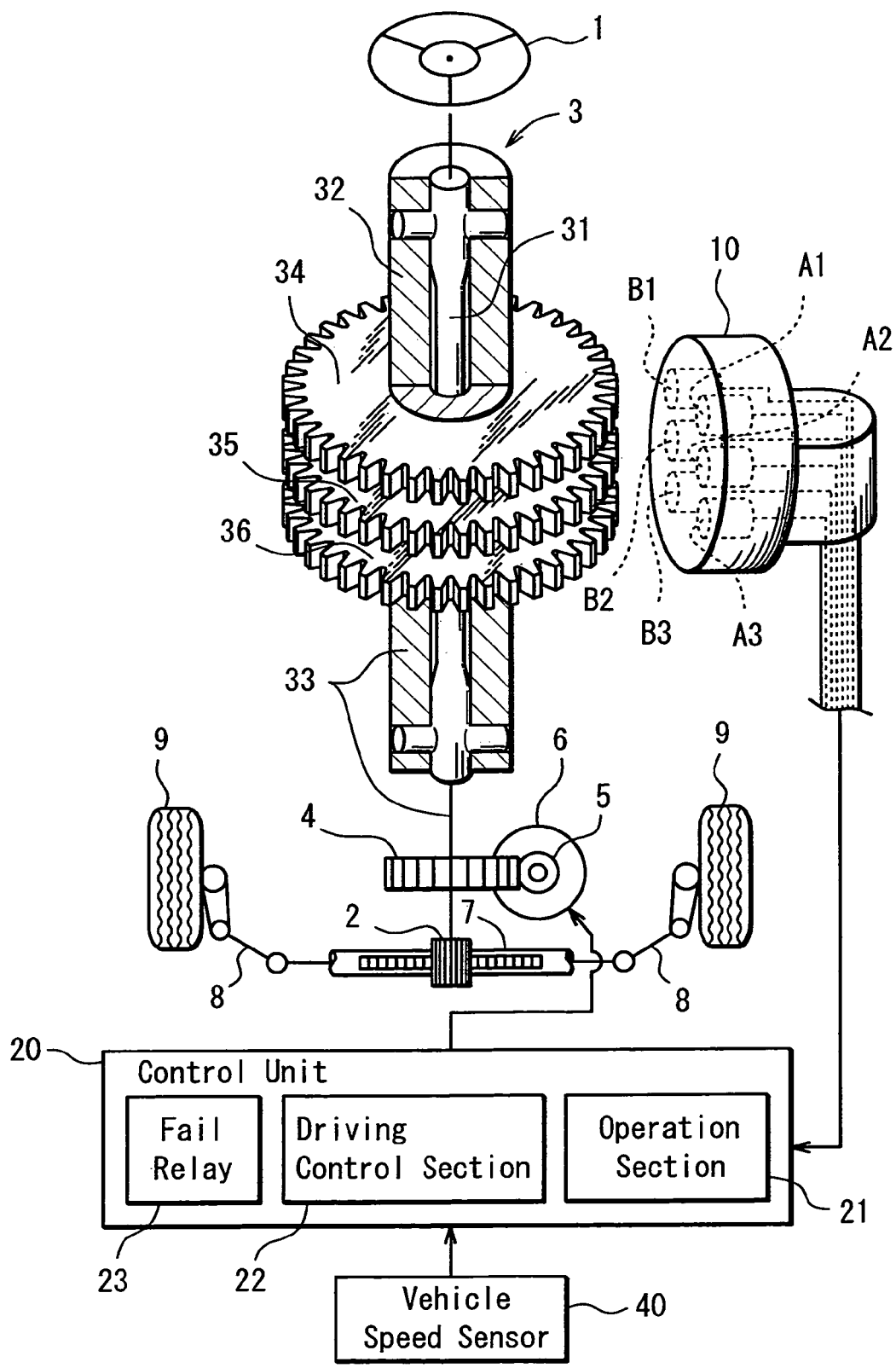
FIG. 1 is a diagram schematically showing a structure of an electric power steering system according to an embodiment of the present invention.

FIG. 1 is a diagram schematically showing a structure of the electric power steering system according to an embodiment of the present invention. Referring to the figure, the electric power steering system is mounted in, for example, an automobile, and has an arrangement wherein a steering shaft 3 is interposed between a steering member (steering wheel) 1 and a pinion 2. The steering shaft 3 includes: a torsion bar 31 disposed at the center portion thereof; an input shaft 32 serving as a first rotary shaft fixed to an input side (upper side) of the torsion bar 31; and an output shaft 33 serving as a second rotary shaft fixed to an output side (lower side) of the torsion bar 31. The input shaft 32 and the output shaft 33 are disposed coaxially with each other but are not directly coupled to each other. Thus, the input shaft 32 and the output shaft 33 are in coaxial connection via the torsion bar 31.

The input shaft 32 is coupled with the steering member 1 so that a rotation of the steering member 1 caused by a steering operation by a driver is directly transmitted to the input shaft 32.

The output shaft 33 is coupled with a reduction mechanism including a worm 5 and a worm wheel 4 meshed therewith, and coupled with an electric motor 6 for steering assist. The electric motor 6 has a shaft unitarily rotatably assembled with the worm 5 and is controlled by a control unit (ECU) 20 as a controller. A rotation of the electric motor 6 is transmitted to the pinion 2 as a steering assist force while reducing the speed thereof by the reduction mechanism. The rotation of the pinion 2 is converted into a linear motion of a rack 7, which steers steerable road wheels 9 via lateral tie rods 8. The reduction mechanism and the electric motor 6 constitute a steering assist section which applies the steering assist force to a steering mechanism extended from the steering member 1 to the steerable road wheels 9.

Figure 2:
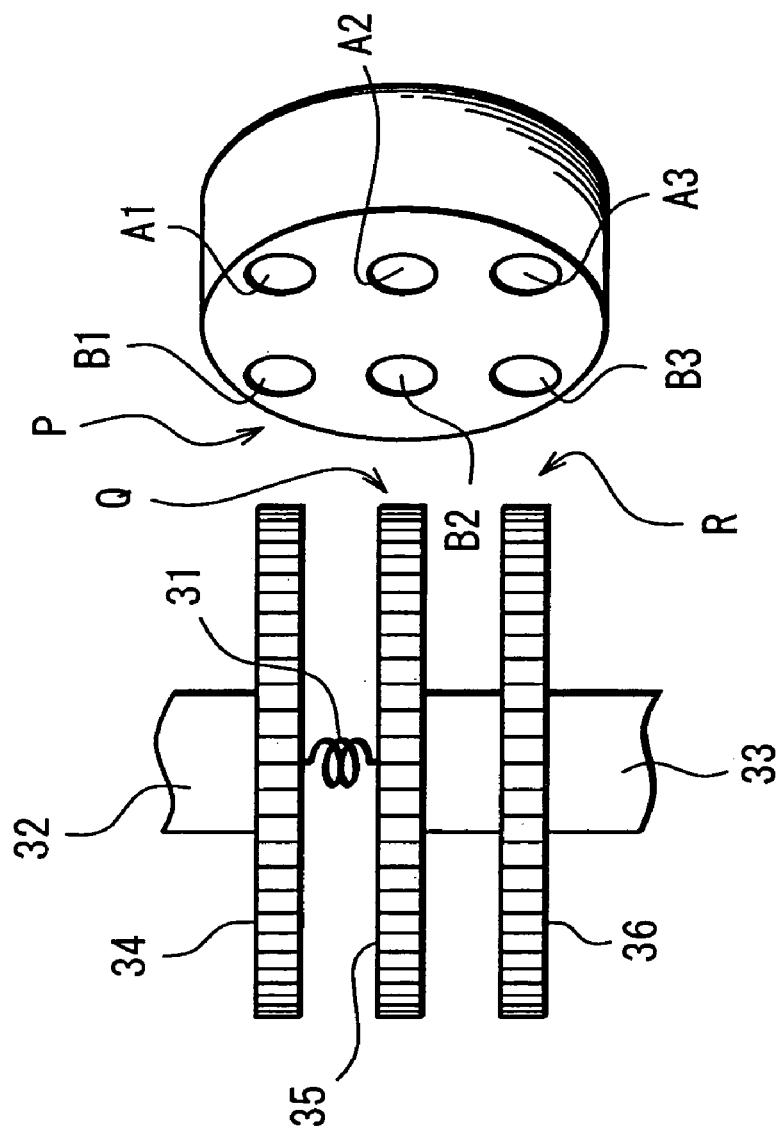
FIG. 2 is a diagram schematically showing a torsion bar, an input shaft, an output shaft, individual target plates and magnetic sensors of the above electric power steering system.
Figure 3:
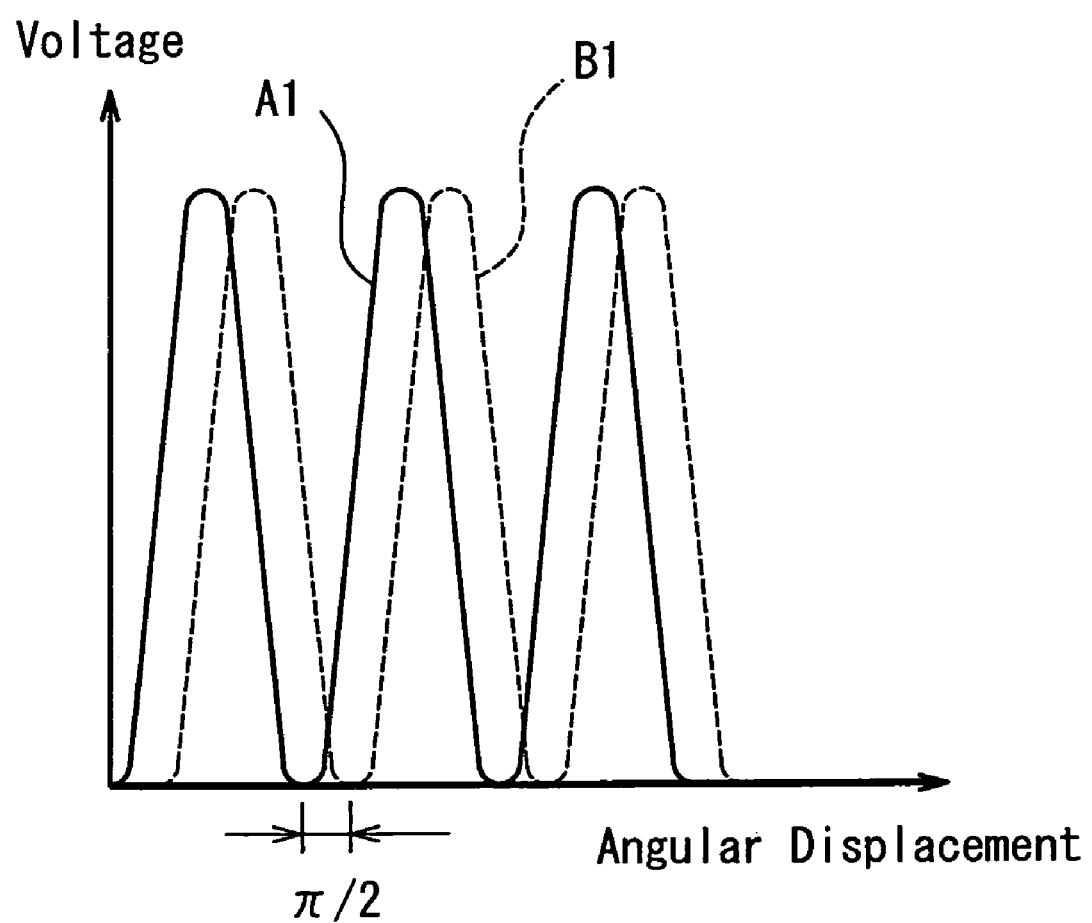
FIG. 3 is a graph representing output signals (voltages) from the magnetic sensors of the above electric power steering system.

The input shaft 32 and the output shaft 33 are provided with sensor sections as first and second rotation detection sections, respectively. The sensor section includes a detector unit for detecting a rotational angle of the input shaft 32 or the output shaft 33, so as to be able to detect the rotational angle of the input shaft 32 or the output shaft 33 which is rotated in conjunction with the steering operation of the steering member 1. More detailed description is made referring to FIG. 2 as well. The input shaft 32 is unitarily rotatably assembled with a first target plate 34, whereas first magnetic sensors A1, B1 are disposed outwardly of an outside circumference of the target plate 34. Likewise, the output shaft 33 is unitarily rotatably assembled with second and third target plates 35, 36, whereas second magnetic sensors A2, B2 and third magnetic sensors A3, B3 are disposed outwardly of respective outside circumferences of the second and third target plates 35, 36.

The first target plate 34 and the first magnetic sensors A1, B2 constitute a first sensor section P which outputs to a control unit 20 a signal corresponding to a rotational angle of the input shaft 32. The second target plate 35 and the magnetic sensors A2, B2 constitute a second sensor section Q which outputs to the control unit 20 a signal corresponding to a rotational angle of the output shaft 33. The third target plate 36 and the third magnetic sensors A3, B3 constitute a third sensor section R which outputs to the control unit 20 a signal corresponding to a rotational angle of the output shaft 33. Thus, the control unit 20 is adapted to detect an absolute rotational position of the output shaft 33 based on the outputs from the second and third sensor sections Q, R.

The target plates 34 to 36 are each formed from a magnetic material in a spur gear shape having external teeth circumferentially arranged with equal spacing. That is, each of the target plates 34 to 36 defines a target having a regularly indented outside circumference. The first target plate 34 and the second target plate 35 have the same number of teeth N (e.g., 36), whereas the number of teeth of the third target plate 36 is prime to N (having no common denominator except 1) (e.g., 35).

The first to the third magnetic sensors A1, B1, A2, B2, A3, B3 are arranged in 2 lines by 3 rows such that a respective pair of the sensors may confront the teeth on the outside circumference of a corresponding one of the target plates 34 to 36. These magnetic sensors A1 to A3, B1 to B3 are accommodated in a sensor box 10, which is fixed to a predetermined place in a vehicle body. The first magnetic sensors A1, B1 individually confront circumferentially different positions of the first target plate 34. Likewise, the second magnetic sensors A2, B2 individually confront circumferentially different positions of the second target plate 35, whereas the third magnetic sensors A3, B3 individually confront circumferentially different positions of the third target plate 36.

Each of the magnetic sensors A1 to A3, B1 to B3 includes an element characterized by being varied in resistance by the action of a magnetic field and exemplified by a magnetoresistive element (MR element). Each of the magnetic sensors A1 to A3, B1 to B3 outputs a voltage signal which is periodically varied according to the regularly indented configuration of the outside circumference of each corresponding target plate 34 to 36. More specifically, when the first target plate 34 is rotated jointly with the input shaft 32 according to the steering operation by the driver, output signals from the first magnetic sensors A1, B1 periodically fluctuate according to a variation (angular displacement) each of the rotational angles of the input shaft 32 and the first target plate 34 due to the regularly indented configuration of the first target plate 34. When the second target plate 35 is rotated jointly with the output shaft 33, output signals from the second magnetic sensors A2, B2 periodically fluctuate according to a variation (angular displacement) each of the rotational angles of the output shaft 33 and the second target plate 35 due to the regularly indented configuration of the second target plate 35. When the third target plate 36 is rotated jointly with the output shaft 33, output signals from the third magnetic sensors A3, B3 periodically fluctuate according to a variation (angular displacement) each of the rotational angles of the output shaft 33 and the third target plate 36 due to the regularly indented configuration of the third target plate 36.

The first magnetic sensors A1 and B1 are disposed opposite the first target plate 34 in a manner that their output signals have a phase difference of say $\pi/2$ based on electrical angle. Likewise, the second magnetic sensors A2 and B2 are disposed opposite the second target plate 35 in a manner that their output signals have a phase difference of say $\pi/2$ based on electrical angle. The third magnetic sensors A3 and B3 are disposed opposite the third target plate 36 in a manner that their output signals have a phase difference of say $\pi/2$ based on electrical angle. In this manner, the respective pairs of magnetic sensors A1 to A3, B1 to B3 in the first to the third sensor sections P, Q, R output the signals shifted in phase relative to each other, thereby offering the following advantage. Even when a non-linear variation appears in proximity of the maximum value or the minimum value of the output waveform in conjunction with the regularly indented configuration of the corresponding target plate 34 to 36, the control unit 20 is allowed to use either one of the output signals from the magnetic sensor pair A1 to A3, B1 to B3 that is in a linear region while the other output signal is in a non-linear region. Thus is prevented the decreased accuracy of the detected rotation of the input shaft 32 or the output shaft 33.

In addition, the number of teeth (=35) of the third target plate 36 is one smaller than that (=36) of the second target plate 35. Hence, the phases of the outputs from the third magnetic sensors A3, B3 are shifted relative to those of the outputs from the second magnetic sensors A2, B2 by $((2\pi/36)-(2\pi/35))$ per rotation $(2\pi/36)$ of the output shaft 33. However, the phase difference returns to zero when the output shaft 33 makes one revolution. Therefore, a relation between the absolute rotational position of the output shaft 33 and the above phase shift may previously be examined and tabulated, such that the absolute rotational position of the output shaft 33 may be determined from the phase shift. Such a table is previously stored in a data storage section of the control unit 20 to be described hereinlater.

The control unit 20 includes: an operation section 21 for executing a predetermined operation using the outputs from the first to the third sensor sections P, Q, R; a driving control section 22 for driving the electric motor 6 by supplying a current thereto based on a command value from the operation section 21; and a fail relay 23 for cutting off the current supply to the electric motor 6 according to a notification signal from the operation section 21. The control unit 20 is adapted to receive a signal indicative of a vehicle speed detected by a vehicle speed sensor 40. The control unit 20 is designed to decide a magnitude of a rotational force (motor power) generated by the electric motor 6 as taking the running speed of the automobile into consideration.

The control unit 20 further includes the data storage section (not shown) constituted by a non-volatile memory or the like. The data storage section previously holds programs, the tabulated information and the like which are necessary for driving and controlling the electric motor 6. Furthermore, the data storage section also stores therein, on an as-needed basis, operation results given by individual parts of the control unit 20 and information sent from the vehicle speed sensor 40 and the like and indicating the running conditions and the like of the automobile.

Figure 4:
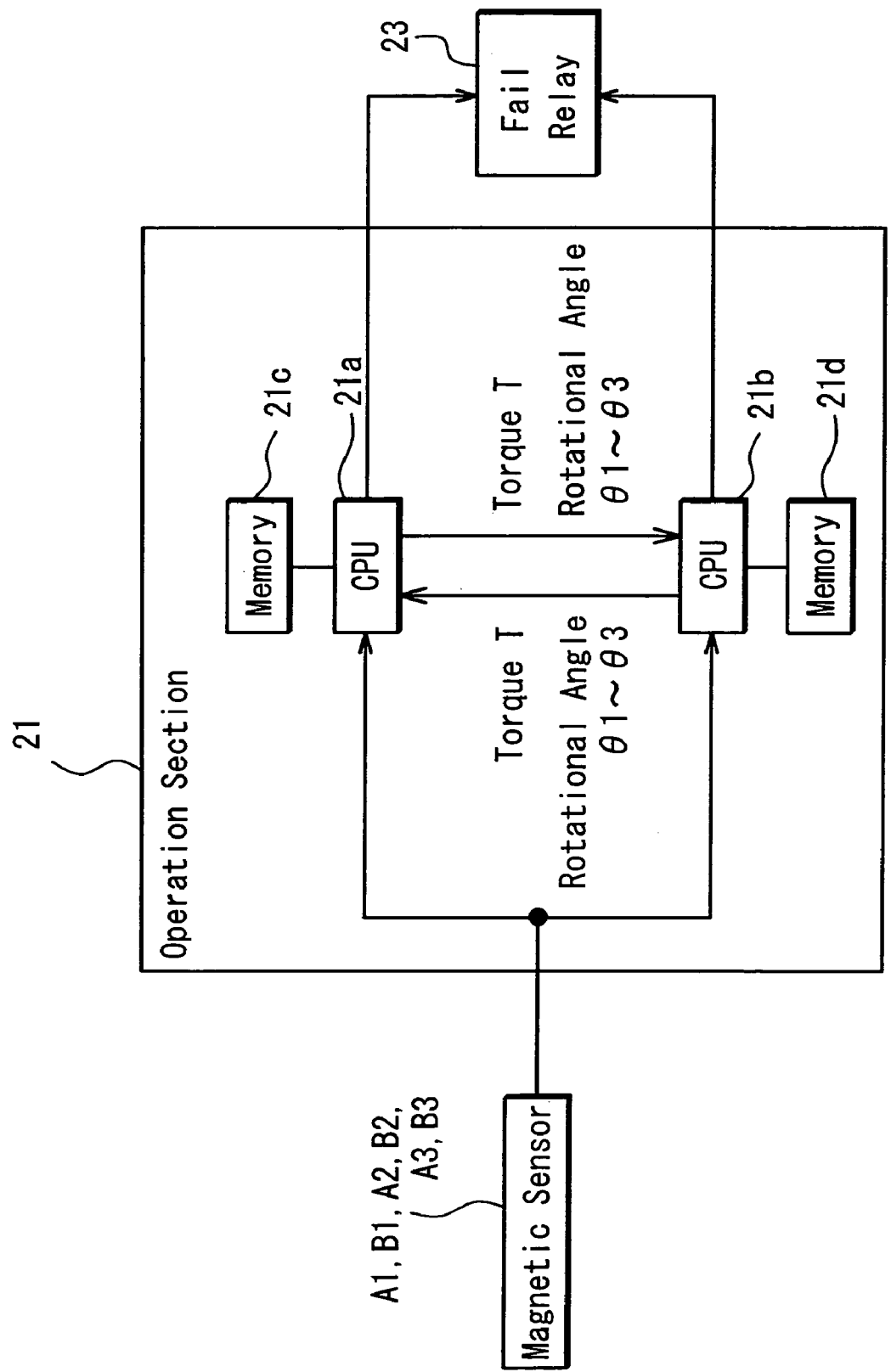
FIG. 4 is a block diagram illustrating an exemplary arrangement of an operation section shown in FIG. 1.

Referring to FIG. 4, the operation section 21 includes: a plurality of e.g., two CPUs 21a, 21b as processors; and memories 21c, 21d which are included in the above data storage section and dedicated to the respective CPUs 21a, 21b. The CPUs 21a, 21b use the output signals from the first sensor section P (magnetic sensors A1, B1) included in the first rotation detection section so as to detect a rotational angle of the steering member 1 side of the steering shaft 3, i.e., the rotational angle of the input shaft 32. In addition, the CPUs 21a, 21b also use the output signals from the second sensor section Q (magnetic sensors A2, B2) or the third sensor section R (magnetic sensors A3, B3) included in the second rotation detection section, so as to detect a rotational angle of the steerable road wheel 9 side of the steering shaft 3, i.e., the rotational angle of the output shaft 33. The CPUs 21a, 21b are designed to function as a torque detection section which uses the detected rotational angles of the input shaft 32 and the output shaft 33 for detecting a steering torque produced on the steering shaft 3 by an input torque applied from the steering member 1 to the steering shaft 3 according to the driver's steering operation and by an inverse input torque such as a disturbance torque inversely inputted to the steering shaft 3 from the steerable road wheels 9 according to the conditions of a roadway surface on which the automobile runs. That is, the steering torque includes the torques applied to the torsion bar 31 from both the steering member 1 and the steerable road wheels 9. The CPUs 21a, 21b are also designed to function to decide the steering assist force to be applied from the steering assist section, the steering assist force decided based on the torque so detected by the torque detection section.

Specifically, the CPUs 21a, 21b are designed to use mutually different operation equations for determining a respective pair of detected values of the rotational angles $\theta 1$, $\theta 2$ of the input shaft 32 and the output shaft 33 and a pair of detected values of torque T. For instance, the CPUs 21a, 21b acquire their respective detection values based on predetermined operation equations such as called a difference equation and a $\tan^{-1}$ equation. That is, the CPU 21a acquires the detected values of the rotational angle $\theta 1$ of the input shaft 32 and of the rotational angle $\theta 2$ of the output shaft 33 (target plate 35) based on, for example, the output signals from the magnetic sensors A1, B1 and the magnetic sensors A2, B2, the signals inputted thereto in a predetermined sampling period. The CPU 21a further acquires the detected value of the torque T by determining an absolute value of relative rotational angle of the input and output shaft 32, 33 based on a difference between the output signals from the magnetic sensor A1 and from the magnetic sensor A2 or a difference between the output signals from the magnetic sensor B1 and from the magnetic sensor B2.

Figure 5:
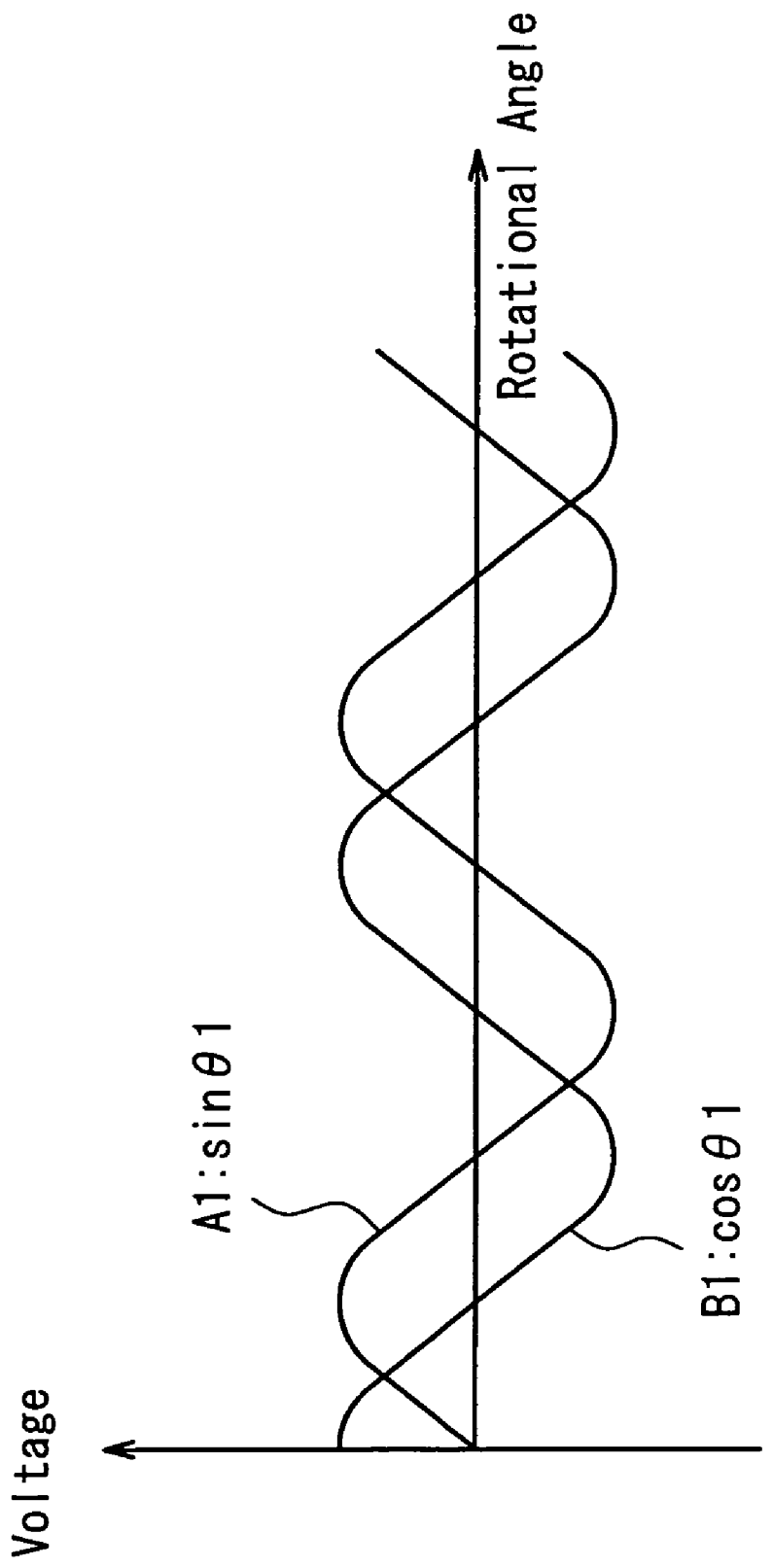
FIG. 5 is a waveform chart showing a relation among outputs from the above magnetic sensors, a sine-waveform, and a cosine-waveform.

On the other hand, the same output signals as those inputted to the CPU 21a are inputted to the CPU 21b from the magnetic sensors A1 to A3, B1 to B3 in the above sampling period. All the output signals from these magnetic sensors Al to A3, B1 to B3 have waveforms analogous to a sine wave. Since the magnetic sensors A1, B1, for example, are disposed to confront the individual positions of the first target plate 34 which are displaced from each other by the electrical angle of $\pi/2$ with respect to the circumferential direction of the first target plate 34, the waveforms of the outputs from these sensors satisfy an equation $\sin(\theta 1 \pm (\pi/2)) = \pm\cos\theta 1$. Therefore, when the input shaft 32 is rotated in a direction from the magnetic sensor B1 toward the magnetic sensor A1, for example, the outputs from the magnetic sensors A1, B1 may be considered to have a $\sin\theta 1$ waveform and a $\cos\theta 1$ waveform, respectively, as shown in FIG. 5. Hence, the CPU 21b can acquire the respective values of the $\sin\theta 1$ and the $\cos\theta 1$ by making reference to the individually corresponding waveforms contained in the table information stored in the data storage section. Then, the CPU 21b is able to determine a value of $\tan\theta 1$ by using the values of the $\sin\theta 1$ and the $\cos\theta 1$ thus determined. Based on an inverse function ($\tan^{-1}$) of the value thus determined, the CPU 21b is able to acquire the presently detected value of the rotational angle $\theta 1$ of the input shaft 32. In the same way, the CPU 21b uses the output signals from the magnetic sensors A2, B2 to determine a detected value of the rotational angle $\theta 2$ of the output shaft 33 (target plate 35) based on the aforesaid inverse function ($\tan^{-1}$). Then, the CPU 21b calculates an absolute value of a difference between the detected value of the rotational angle $\theta 1$ and the detected value of the rotational angle $\theta 2$, and thereby to acquire a detected value of the torque T.

The CPUs 21a, 21b are also adapted to use the output signals from the magnetic sensors A3, B3 so as to determine an absolute value of an absolute rotational angle of the output shaft 33 and to calculate a torque T. This provides for a more accurate control taking the direction of the steerable road wheels 9 into consideration.

The control unit 20 is arranged such that the CPUs 21a, 21b of the operation section 21 thereof compare the respectively determined detection values with each other thereby constantly monitoring each other. The CPUs 21a, 21b examine each other as to the occurrence of a failure such as an abnormal operation, or the occurrence of a failure such as an abnormal output from any one of the magnetic sensors of six channels, thereby contributing to the enhanced reliability of the control unit 20 as well as of the electric power steering system.

In the control unit 20, the fail relay 23 receives signals from the CPUs 21a, 21b, the signals each indicating a result of comparison of the detection values. Thus, the fail relay 23 is designed to prevent the execution of an erroneous steering assist by inhibiting the power supply to the electric motor 6 when all of the first to the third sensor sections P, Q, R are out of order or when none of the CPUs 21a, 21b inputs the notification signal thereto.

The control unit 20 is adapted to provide a driving control of the electric motor 6 by way of either one of a normal torque control mode wherein the operation section 21 thereof uses the detected value of the torque T, and a steering angle control mode which is performed when the detected value of the torque is not available and which uses any one of the detected values of the rotational angles $\theta 1$, $\theta 2$, $\theta 3$ individually determined from the outputs from the first to the third sensor sections P, Q, R. The control unit 20 is adapted for bi-directional shift between the torque control mode and the steering angle control mode. This permits the control unit 20 to prevent the steering assist based on the motor power from being suspended except for a case where an unrecoverable serious failure occurs to activate the fail relay 23. Accordingly, the automobile vehicle may be prevented from suffering the impaired steerability resulting from the suspended steering assist.

Unlike the torque control mode, the steering angle control mode is designed to daringly make the driver operating the steering member 1 experience a somewhat unusual steering feeling, thereby notifying the driver of the occurrence of a failure or the like which disables the acquisition of the detected value of the torque (A detailed description on this regard will be made hereinlater).

The steering angle control mode is designed such that when the control unit 20 is allowed again to acquire the detected value of the torque, the unit 20 provides the steering assist as shifted from the steering angle control mode to the torque control mode. Thus, the control unit 20 is adapted to return to the assist control based on the detected value of the torque when the first sensor section P or the like having suffered from a temporary failure or the like recovers from such a failure.

The control unit 20 further features the following arrangement. When a failure is detected by means of the aforementioned mutual examination of the CPUs 21a, 21b for determining whether any one of the first to the third sensor sections P, Q, R sustains the failure or not, the operation section 21 stores, in the data storage section, predetermined information pieces relating to the failure as history information. The history information includes the contents of failure such as a date of occurrence of the detected failure, the duration thereof and an abnormal detection value; and the number of occurrences of the failure. The history information is managed with respect to each of the first to the third sensor sections P, Q, R, for instance. The operation section 21 recognizes and determines the frequencies of the occurrence of failure at each of the sensor sections P, Q, R based on, for example, the data on the number of occurrences of failures which are included in the existing history information stored in the data storage section. Thus, the operation section 21 keeps track of the level of failure at each of the sensor sections P, Q, R.

More specifically, the operation section 12 makes judgment on the data on the occurrences of failures as follows, thereby classifying the sensor sections P, Q, R into three failure levels. That is, any one of the sensor sections P, Q, R that is related to data wherein the number of data pieces indicative of non-detectable rotational angle is less than a first threshold value is determined to be normal. A sensor section related to data wherein the number of data pieces indicative of non-detectable rotational angle is not less than the first threshold value is determined to suffer failure sometimes. A sensor section related to data wherein the number of data pieces indicative of non-detectable rotational angle is not less than a second threshold value is determined to be constantly out of order. The control unit 20, in turn, selects any one of the torque control mode, the steering angle control mode and the fail mode based on the existing history information (failure levels) and the results of determination on the occurrence of a failure, the determination made at the time when the torque is produced on the torsion bar, i.e., when the motor power is applied to the steering mechanism.

Specifically, in a case where the operation section 21 finds out the respective levels of failures at the first to the third sensor sections P, Q, R as shown in the left-hand columns of each of Table 1 to Table 3, the control unit 20 performs the mode selection as follows to carry out the selected mode. When the operation section 21 recognizes and determines the sensor sections P, Q, R to be free from failure based on the present input signals from the sensor sections P, Q, R, the control unit 20 selects any of the assist modes shown in the right-hand columns of the table and carries out the selected mode. It is noted that the symbols ○, Δ, × in the left-hand columns of each of Table 1 to Table 3 indicate that the operation section 21 determines, based on the history information, that the sensor section is in normal, suffers failure sometimes, or is constantly out of order.

When the operation section 21 determines from the present input signals that a failure has occurred, the operation section 21 selects any one of the following modes and carries out the selected mode, the modes including: a torque control mode using only normal rotational angles, i.e., using a torque calculated from the rotational angles θ1, θ2 or the rotational angles θ2, θ3; a steering angle control mode using any one of the rotational angles that is of a normal value; and a fail mode.

TABLE 1

| Failure Levels | | | Assist Mode | | |
|---|---|---|---|---|---|
| First Sensor Section; θ1 | Second Sensor Section; θ2 | Third Sensor Section; θ3 | Torque Control Mode | Steering Angle Control Mode | Fail Mode |
| ○ | ○ | ○ | ◎ | | |
| ○ | ○ | Δ | ◎ | | |
| ○ | ○ | X | ◎ | | |
| ○ | Δ | ○ | ◎ | | |
| ○ | Δ | Δ | ◎ | ○ | |
| ○ | Δ | X | ◎ | ○ | |
| ○ | X | ○ | ◎ | | |
| ○ | X | Δ | ◎ | ○ | |
| ○ | X | X | ◎ | ◎ | |

TABLE 2

| Failure Levels | | | Assist Mode | | |
|---|---|---|---|---|---|
| First Sensor Section; θ1 | Second Sensor Section; θ2 | Third Sensor Section; θ3 | Torque Control Mode | Steering Angle Control Mode | Fail Mode |
| Δ | ○ | ○ | ◎ | ○ | |
| Δ | ○ | Δ | ◎ | ○ | |
| Δ | ○ | X | ◎ | ○ | |
| Δ | Δ | ○ | ◎ | ○ | |
| Δ | Δ | Δ | | | ◎ |
| Δ | Δ | X | | | ◎ |
| Δ | X | ○ | ◎ | ○ | |
| Δ | X | Δ | | | ◎ |
| Δ | X | X | | | ◎ |

TABLE 3

| Failure Levels | | | Assist Mode | | |
|---|---|---|---|---|---|
| First Sensor Section; θ1 | Second Sensor Section; θ2 | Third Sensor Section; θ3 | Torque Control Mode | Steering Angle Control Mode | Fail Mode |
| X | ○ | ○ | ◎ | | |
| X | ○ | Δ | ◎ | | |
| X | ○ | X | ◎ | | |
| X | Δ | ○ | ◎ | | |
| X | Δ | Δ | | | ◎ |
| X | Δ | X | | | ◎ |
| X | X | ○ | | ◎ | |
| X | X | Δ | | | ◎ |
| X | X | X | | | ◎ |

In Table 1 and Table 2, it is shown that a torque control mode represented by ◎ is carried out in preference to a steering angle control mode represented by ○. That is, the control unit 20 is designed to operate as follows. In a case where the operation section 21 determines the first sensor section P to be normal or to suffer failure sometimes, the operation section 21 follows the present determination results to judge that the first sensor section P is free from failure. Furthermore, when the operation section 21 judges that at least one of the second sensor section Q and the third sensor section R is free from failure, the torque control mode is carried out in preference to the steering angle control mode.

As shown in Table 2 and Table 3, in a case where all the first to the third sensor sections P, Q, R are determined to suffer failure sometimes or to be constantly out of order, the control unit 20 determines that all these sensor sections P, Q, R suffer serious failures, and selects the fail mode instead of the torque control mode or the steering angle control mode, irrespectively of the determination results represented by the present input signals. Thus, the control unit 20 gives top priority to the safety of the running vehicle.

As described above, the operation section 21 performs the mode selection as keeping track of the failure level with respect to each of the sensor sections P, Q, R. This not only ensures the safety of the running vehicle but also facilitates the optimization of the assist control.

The control unit 20 is also designed to make reference to the history information as required so as to give a passenger on the automobile, such as the driver, a warning according to the level of the failure. Specifically, when it is determined that the first sensor section P suffers failure sometimes or is constantly out of order, for example, the control unit 20 immediately activates notification means, which are mounted at the automobile, such as an indicator lamp on a dashboard panel or a speaker to visually or audibly notify the passenger of the level of the failure. Furthermore, the control unit 20 is also designed to count the number of times to shift the steering assist to the steering angle control mode, so that the passenger may be warned when the count exceeds a predetermined value. The history information thus accumulated facilitates troubleshooting or the like during the vehicle maintenance services or the like. Furthermore, it is ensured that the passenger is informed of a failure at an early stage from the occurrence thereof by giving the warning according to the level of the failure. Thus, the vehicle is prevented from running for a long period of time as sustaining the failure. In addition, in the case of frequent shifts between the torque control mode and the steering angle control mode, the control unit 20 determines that a recoverable failure or the like has occurred and informs the passenger of the failure before the failure or the like becomes unrecoverable. Thus, the control unit 20 obviates the occurrence of a fatal failure.

Alternative arrangements to the above are also possible. After the above count exceeds the predetermined value, the control unit 20 may not shift the steering angle control mode to the torque control mode but may continue the steering angle control mode even if the detected value of the torque becomes available. In another arrangement, the control unit 20 may shift the control mode to the torque control mode in which, just as in the steering angle control mode, a kind of inadequate steering assist may be provided such as to make the driver experience the unusual steering feeling, and thereby notifying the driver of the occurrence of the failure. While the foregoing description pertains to the arrangement wherein the history information is managed with respect to each of the first to third sensor sections P, Q, R, an alternative arrangement may be made wherein the history information is managed with respect to each of the magnetic sensors of each sensor section.

Now referring to FIG. 1 to FIG. 8, a detailed description is made on the operations of the electric power steering system arranged as described above. In the interest of simplicity of explanation, the following description is made on the operations of the system by way of an example where the history information on all the magnetic sensors of the first to the third sensor sections P, Q, R do not contain a data piece indicative of the occurrence of failure, or where the control unit 20 determines the sensor sections P, Q, R to be in normal operations.

Figure 6:
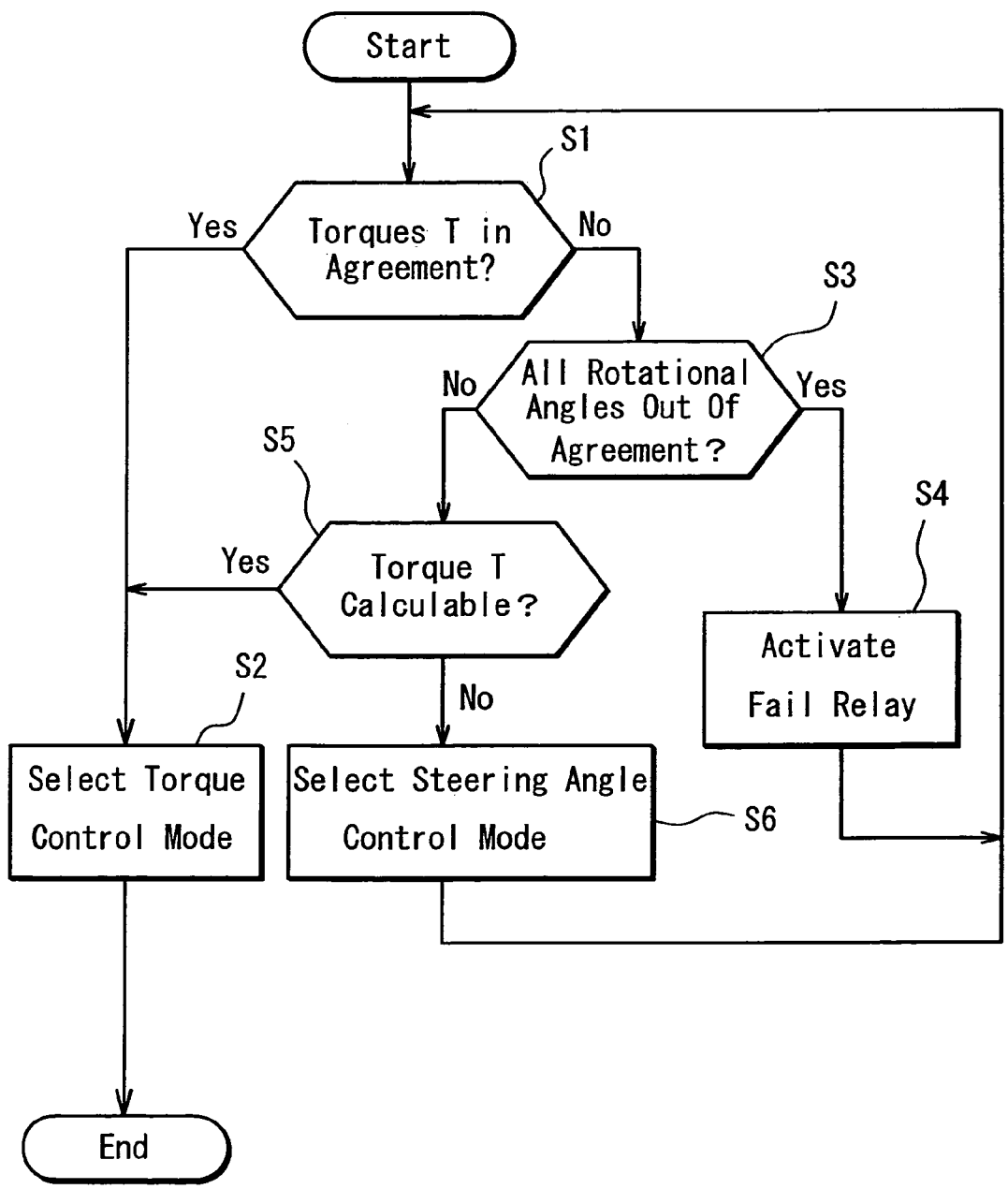
FIG. 6 is a flow chart showing principal operations carried out in the above electric power steering system.

In the control unit 20, as indicated by Step S1 in FIG. 6, the determination is made as to whether the detected values of the torque T given by the CPUs 21a, 21b are in agreement or not. When the detected values of the torque T agree with each other, the CPUs 21a, 21b output notification signals to the fail relay 23, the signals indicating that the detected value of the torque is of a normal value. Then, the control unit 20 determines that the detected torque value is available and thence, determines that the CPUs 21a, 21b and the individual magnetic sensors of six channels A1 to A3, B1 to B3 are all free from failure. Accordingly, the control unit 20 selects the torque control mode (Step S2).

In the torque control mode, out of the two CPUs 21a, 21b, one that is arranged as a main processor, such as the CPU 21a, decides a target current value for the electric motor 6 based on the detected value of the torque. The CPU 21a provides a feedback control based on the target current value thus decided, thereby supplying the current to the electric motor 6 which, in turn, applies the motor power to the steering mechanism according to the driver's steering operation and the like. Thus, the torque control mode provides the steering assist wherein the steering feeling may be impaired as little as possible.

On the other hand, if the detected values of the torque T given by the CPUs 21a, 21b do not agree with each other in the above Step S1, the control unit 20 determines that the torque value is not available and then makes determination as to whether all the detected rotational angles θ1 to θ3 given by the CPUs 21a, 21b are out of agreement or not (Step S3).

Referring to FIG. 7, a detailed description is made on each case where the respective pair of detected values of the torque T and of the rotational angles θ1 to θ3 given by the CPUs 21a, 21b are in agreement or out of agreement.

Figure 7A:
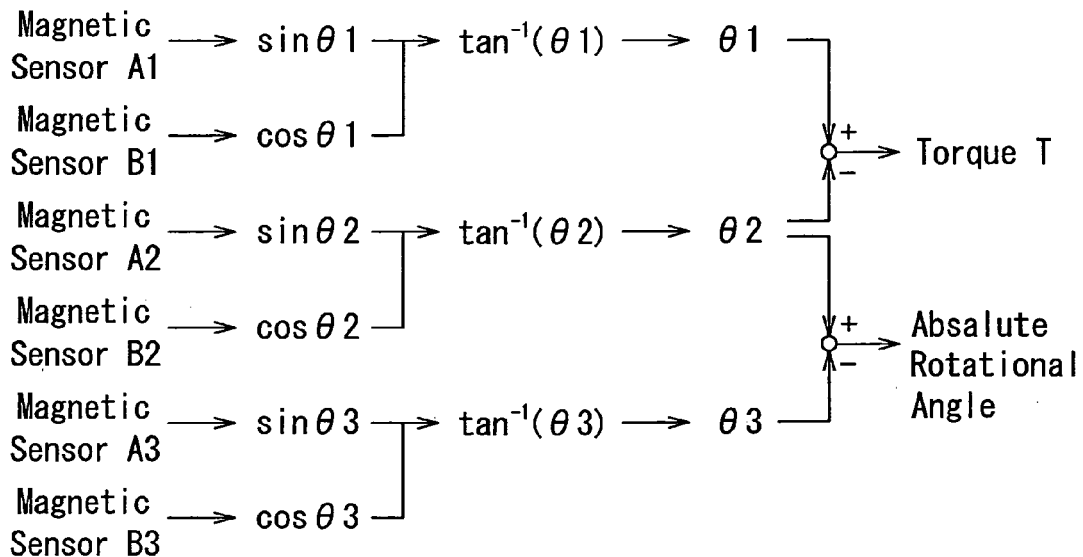
FIG. 7 is a group of charts each showing, in chronological order, exemplary operations of the above operation section for acquiring a toque based on the outputs from the magnetic sensors, FIG. 7A representing a time chart of a case where all the magnetic sensors of multiple channels are operating normally, FIG. 7B representing a time chart of a case where one channel of the magnetic sensors sustains abnormality.

Referring to FIG. 7A, when the magnetic sensors A1 to A3, B1 to B3 apply the output signals to the control unit 20, the individual CPUs 21a, 21b of the operation section 21 thereof check each of the first to the third sensor sections P, Q, R to determine whether each sensor output is normal or not. Specifically, the CPUs 21a, 21b substitute the respective values of sin θ1 and cos θ1 obtained from the output signals from the magnetic sensors A1, B1 into, for example, an equation (1) $(\sin θ1)^2+(\cos θ1)^2=1$. When this equation (1) is satisfied, the CPUs 21a, 21b determine that the output signals from the sensors A1, B1 are normal.

Next, the CPU 21b, for example, calculates the rotational angle θ1 of the input shaft 32 using the aforesaid inverse function ($\tan^{-1}$), as shown in the figure. Likewise, the CPU 21b also calculates the detected rotational angles θ2, θ3 of the second and third target plates 35, 36 of the output shaft 33. The CPU 21b calculates the detected value of the torque based on a difference between the detected rotational angles θ1, θ2 and then, sends the resultant detected value of the torque to the main CPU 21a.

On the other hand, the main CPU 21a also obtains the accurate detected rotational angles θ1 to θ3 and torque T based on the outputs from the normal sensor sections P, Q, R. The sensor sections P, Q, R apply their outputs to the CPU 21a and the CPU 21b simultaneously. When these detected values are equal to the respectively corresponding detected values from the CPU 21b, that is, when the detected values of the torque agree with each other, the operation of Step S2 is carried out.

Figure 7B:
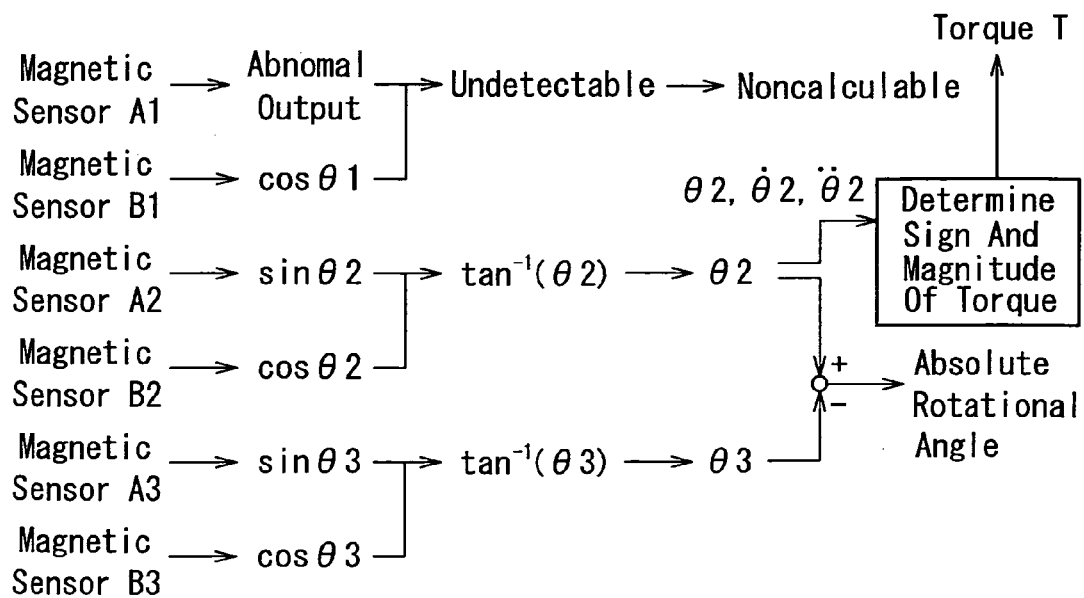

On the other hand, as shown in FIG. 7B, in a case, for example, where the magnetic sensor A1 itself sustains a permanent or temporary failure, where external noises enter a wire interconnecting the sensor A1 and the control unit 20, or where a loose connection occurs at a contact terminal provided at an end of the wire, the sensor A1 provides an output signal of an abnormal value. In the event of such an abnormal output from the magnetic sensor A1, the value of the output signal from the sensor A1 and that from the sensor B1 paired therewith fail to satisfy the above equation (1), so that the CPU 21$b$ determines that the first sensor section P sustains a failure. Furthermore, the abnormality or the like of the sensor A1 entails inability for the CPU 21$b$ to calculate the detected rotational angle θ1 based on the inverse function (tan$^{-1}$). This also leads to inability to calculate the detected value of the torque. Hence, the CPU 21$b$ sends to the CPU 21$a$ the detected rotational angles θ2, θ3 calculated accurately.

The CPU 21$a$ is also disabled for the calculation of the detected rotational angle θ1 and torque T because of the abnormal output from the sensor A1. Likewise to the CPU 21$b$, the CPU 21$a$ sends the accurately determined rotational angles θ2, θ3 to the CPU 21$b$. Thus, the CPUs 21$a$, 21$b$ output to the fail relay 23 a notification signal indicating that only the detected rotational angles θ2, θ3 are in agreement. In the meantime, it is determined in the above Step S1 that the detected torque values are out of agreement. Hence, the control unit 20 determines that the detected torque value is not available.

In the other cases than the above, where the CPU 21$b$, for example, cannot make reference to some of the table information stored in the memory 21$d$ so as to be unable to calculate the detected value of the torque T or the detected rotational angle θ1 or θ2 used for calculating the detected torque value, it is determined in the above Step S1 that the detected torque values are out of agreement. Hence, the control unit 20 determines that the detected torque value is not available.

Returning to Step S3 in FIG. 6, when all the detected rotational angles θ1 to θ3 given by the CPUs 21$a$, 21$b$ are out of agreement, the CPUs 21$a$, 21$b$ output to the fail relay 23 a notification signal indicating that all the detected rotational angles θ1 to θ3 are out of agreement. Then, the fail relay 23 is activated (Step S4), and thereby to inhibit the current supply to the electric motor 6.

On the other hand, in a case where at least one of the detected rotational angle pairs θ1 to θ3 are in agreement, the control unit 20 makes determination as to the ability to calculate the torque T (Step S5). When the control unit 20 determines that the torque T is calculable, the control unit 20 proceeds to Step S2 to select the torque control mode. When the control unit 20 determines that the torque T is non-calculable, the control unit 20 selects the steering angle control mode using any one of the detected rotational angles that is of a normal value (Step S6).

A specific operation in the above Step S5 is described with reference to FIG. 8.

Figure 8:
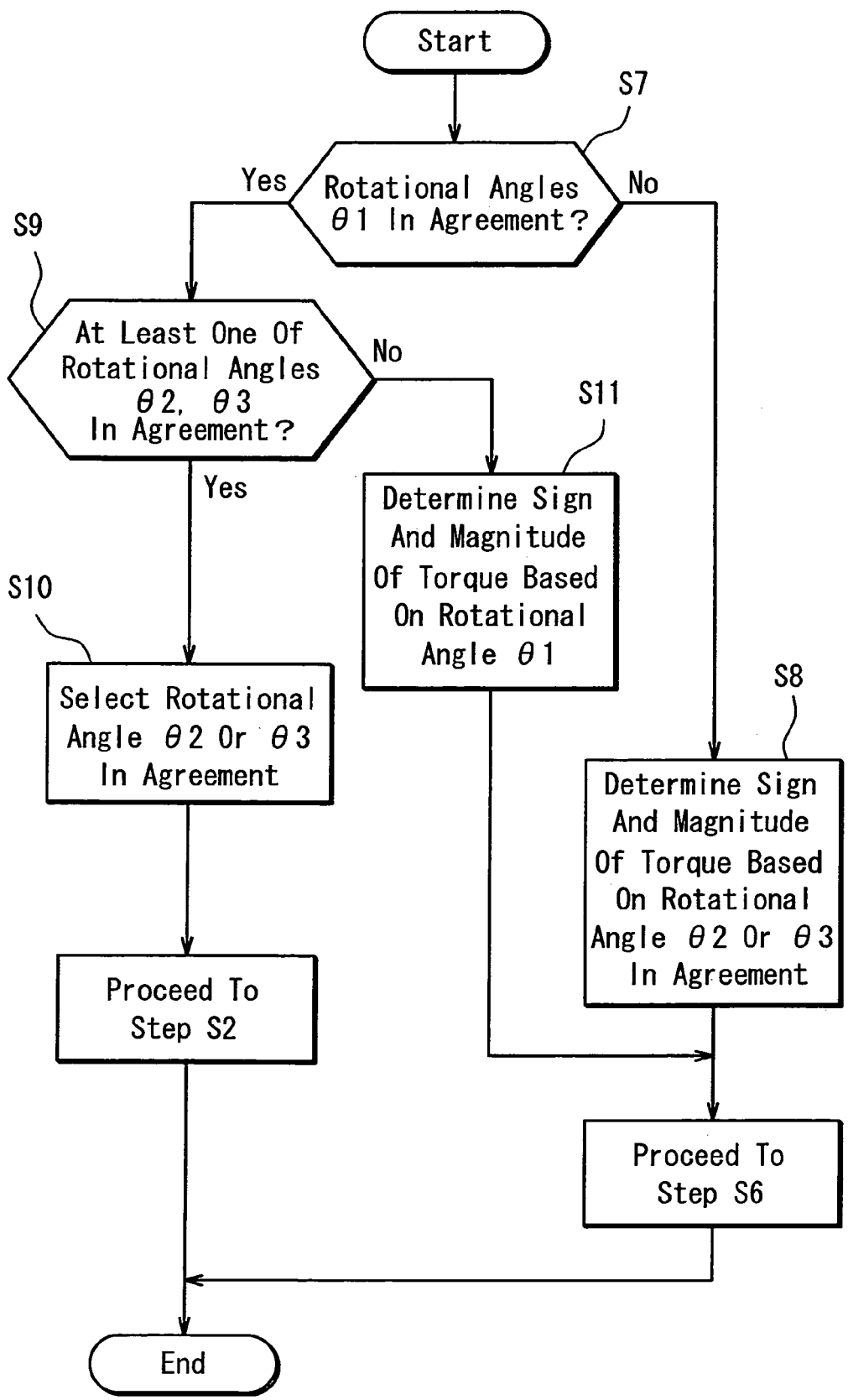
FIG. 8 is a flow chart showing specific operations of Step S5 of FIG. 6.

As shown in FIG. 8, each of the CPUs 21$a$, 21$b$ firstly determines whether the detected rotational angles θ1 agree with each other or not (Step S7). If it is determined that the detected rotational angles θ1 do not agree with each other, the control unit 20 determines that the torque control mode is non-executable, so that the main CPU 21$a$, for example, selects, from the remaining rotational angles θ2, θ3, one rotational angle pair θ2 or θ3 the detected values of which are in agreement. Then, the CPU 21$a$ determines the sign of the torque and the magnitude thereof based on the selected rotational angle θ2 or θ3 (Step S8). In the above Step S6, the steering angle control mode is selected based on the sign and magnitude of torque thus determined, so as to provide the driving control of the electric motor 6. Specifically, as shown in FIG. 7B, the control unit 20 calculates the detected rotational angle θ2 in agreement, for example, as well as an angular speed and an angular acceleration of the rotational angle θ2, based on which the sign and magnitude of the torque are determined so as to estimate the assist force (motor power) according to the steering operation or the like. The control unit 20 provides the driving control of the electric motor 6 in the steering angle control mode by, for example, varying time to supply the current to the electric motor 6 according to the magnitude of the torque thus determined, so that 50% of the estimated assist force from the motor power, for example, may be applied to the steering assist mechanism. This permits the steering angle control mode to daringly make the driver experience a somewhat unusual steering feeling, which is not provided in the torque control mode.

On the other hand, when it is determined in the above Step S7 that the detected rotational angles θ1 agree with each other, determination is made as to whether at least one of the detected rotational angle pairs θ2, θ3 are in agreement or not (Step S9). Out of the detected rotational angles θ2, θ3, one rotational angle pair θ2 or θ3 in agreement are selected (Step S10). In the control unit 20, the main CPU 21$a$, for example, calculates a torque T based on the detected rotational angle θ2 or θ3 so selected and the detected rotational angle θ1. Thus, the control unit 20 carries out the torque control mode using the resultant detected torque value.

If it is determined in the above Step S9 that none of the detected rotational angles θ2, θ3 is in agreement, the CPU 21$a$ of the control unit 20 determines the sign and magnitude of the torque based on the rotational angle pair θ1 in agreement, just as in the above Step S8 (Step S11). The control unit 20 provides the driving control of the electric motor 6 in the steering angle control mode based on the sign and magnitude of the torque so determined from the rotational angle θ1.

In the electric power steering system of the embodiment arranged as described above, the control unit (controller) 20 is designed to provide the driving control of the electric motor 6 as bi-directionally shifting the control between the torque control mode and the steering angle control mode. This permits the control operation to return from the steering angle control mode to the torque control mode by sequentially performing the operations of Step S6 in FIG. 6 and of Steps S1 and S2 shown in the same figure when a temporary failure or the like involving at least one of the magnetic sensor side and the CPU 21$a$, 21$b$ (processor) side is eliminated so that the magnetic sensor or the CPU recovers the normal state to be able to acquire the detected torque value again. Moreover, the control unit 20 is able to detect the occurrence of failure involving at least one of the sensor side and the processor side as well as the elimination of the failure. As a result, the following advantage is afforded in the event of a recoverable and/or minor failure involving at least one of the sensor side and the processor side except for the occurrence of a fatal or serious failure. Unlike the conventional example, the embodiment can obviate the problem that the optimum assist control using the accurate detected value of the torque is not carried out after the elimination of the failure. Furthermore, the control unit 20 is adapted to detect the elimination of the failure or the like. This prevents the control unit 20 from erroneously informing the driver or the like of the continuation of the failure although in fact, the failure or the like is eliminated. This also saves the driver doing unnecessary maintenance and/or repair associated with the erroneous detection of the failure. Hence, the electric power steering system may be prevented from suffering seriously decreased reliability.

As indicated by Step S9 in FIG. 8, the embodiment is designed such that the torque control mode is carried out in preference to the steering angle control mode when the control unit 20 determines the first sensor section P to be free from failure and also determines that at least one of the second and third sensor sections Q, R is free from failure. Therefore, when the control unit 20 detects the elimination of a temporary failure involving at least one of the sensors (detector units) in each of the first and second rotation detection sections, the control unit 20 immediately selects the torque control mode instead of the steering angle control mode. The torque control mode features a better steering feeling than the steering angle control mode. As a result, the control unit 20 is capable of providing an even more favorable assist control thereby easily obviating the impairment of steerability of the vehicle.

While the foregoing description pertains to the arrangement wherein the first sensor section is disposed at the first rotation detection section for the input shaft whereas the second and third sensor sections are disposed at the second rotation detection section for the output shaft, the present invention may be arranged in any way to make determination on the occurrence of failure with respect to each of the plural sensor sections (detector units) belonging to each of the first and second rotation detection sections, and to drive the electric motor as shifting the driving control between the torque control mode and the steering angle control mode based on results of the determination. Hence, the number of detector units provided at each rotation detection section, the unit arrangement including the number of sensor channels and the like, and the type of the sensor and the like are not limited to foregoing embodiment.

While the foregoing description pertains to the arrangement wherein the operation section of the control unit is applied with the function of the torque detection section which uses the detection results from the magnetic sensors for detecting a torque applied to the torsion bar, the present invention is not limited to this. For instance, there may be provided a torque sensor which is independent from the aforementioned magnetic sensors and which outputs to the operation section a signal indicative of a detected value of the torque. Such an arrangement permits the present invention to be also applied to a steering system wherein the operation section is not applied with the function of the torque detection section.

While the foregoing description pertains to the arrangement wherein the steering angle control mode provides the driving control of the electric motor 6 in a manner that the driver operating the steering member 1 is daringly made to experience a somewhat unusual steering feeling, the present invention is not limited to this. For instance, the following approach may be adopted. The normal detected rotational angle θ2 may be used for substantially accurately estimating the torque according to the driver's steering operation and the like, while the target current value for the electric motor 6 may be decided just as in the torque control mode and used for driving the electric motor 6 as preventing the impairment of the steering feeling.

According to the description made referring to the time chart of FIG. 7B, the steering angle control mode is carried out using the detected rotational angle θ2 and the angular speed and angular acceleration thereof when the rotational angle θ1 is not available. However, the present invention is not limited to this. There may be used detection results from a variety of sensors, based on which results the sign of the torque and the magnitude thereof may be determined and used for estimating the assist force according to the steering operation and the like. Specifically, the steering angle control mode may be carried out using, for example, the detected value of the rotational angle θ3, the yaw rate or the vehicle speed.

While the foregoing description pertains to the arrangement wherein the operation section (controller) includes the two CPUs (processors) which calculate the detected value of the torque based on the difference equation and the $\tan^{-1}$ equation, the present invention is not limited to this. The number of processors and the operation equations thereof are not limited to the above. Specifically, the operation section may include one processor using the other operation equation than the above, or a plurality of processors using the same operation equation for calculating the detected value. It is noted however that the arrangement including the plural processors operating based on the mutually different operation equations has a higher tendency that the individual processors provide different operation results in the event of a failure or abnormality. Thus, this arrangement is adapted to detect the failure more quickly so that the reliability is further increased. In this respect, this arrangement is more preferred.

What is claimed is:

1. An electric power steering system providing a steering assist by applying a power of an electric motor to a steering mechanism extended from a steering member to steerable road wheels, the electric power steering system comprising:
a first rotary shaft coupled to said steering member;
a second rotary shaft connected to said first rotary shaft via a torsion bar;
a first rotation detection section comprising one or more detector units for outputting a signal corresponding to a rotation of said first rotary shaft;
a second rotation detection section comprising one or more detector units for outputting a signal corresponding to a rotation of said second rotary shaft; and
a controller detecting respective rotational angles of said first and second rotary shafts and a torque on said torsion bar based on the output signals from said first and second rotation detection sections, and providing a driving control of said electric motor,
said controller checking each of plural detector units of said first and second rotation detection sections to make determination on the occurrence of a failure based on the output signals thereof, and providing the driving control of said electric motor as shifting the driving control, based on results of the determination, between a torque control mode using a detected value of said torque and a steering angle control mode using a detected value of either one of the rotational angles of said first and second rotary shafts; and
wherein said controller manages history information on the occurrence of failure with respect to each of said plural detector units, and selects either said torque control mode or said steering angle control mode based on said results of the determination and said history information.

2. An electric power steering system providing a steering assist by applying a power of an electric motor to a steering mechanism extended from a steering member to steerable road wheels, the electric power steering system compnsing:
a first rotary shaft coupled to said steering member;
a second rotary shaft connected to said first rotary shaft via a torsion bar;
a first rotation detection section comprising one or more detector units for outputting a signal corresponding to a rotation of said first rotary shaft;

a second rotation detection section comprising one or more detector units for outputting a signal corresponding to a rotation of said second rotary shaft; and a controller detecting respective rotational angles of said first and second rotary shafts and a torque on said torsion bar based on the output signals from said first and second rotation detection sections, and providing a driving control of said electric motor, said controller checking each of plural detector units of said first and second rotation detection sections to make determination on the occurrence of a failure based on the output signals thereof, and providing the driving control of said electric motor as shifting the driving control, based on results of the determination, between a torque control mode using a detected value of said torque and a steering angle control mode using a detected value of either one of the rotational angles of said first and second rotary shafts; and wherein when said controller determines that at least one of the detector units of said first rotation detection section is free from failure and that at least one of the detector units of said second rotation detection section is free from failure, the controller carries out said torque control mode in preference to said steering angle control mode.

3. An electric power steering system according to claim 1, wherein when said controller determines that at least one of the detector units of said first rotation detection section is free from failure and that at least one of the detector units of said second rotation detection section is free from failure, the controller carries out said torque control mode in preference to said steering angle control mode.

4. An electric power steering system providing a steering assist by applying a power of an electric motor to a steering mechanism extended from a steering member to steerable road wheels, the electric power steering system comprising:

a first rotary shaft coupled to said steering member;

a second rotary shaft connected to said first rotary shaft via a torsion bar;

a first rotation detection section comprising one or more detector units for outputting a signal corresponding to a rotation of said first rotary shaft;

a second rotation detection section comprising one or more detector units for outputting a signal corresponding to a rotation of said second rotary shaft; and a controller detecting respective rotational angles of said first and second rotary shafts and a torque on said torsion bar based on the output signals from said first and second rotation detection sections, and providing a driving control of said electric motor, said controller checking each of plural detector units of said first and second rotation detection sections to make determination on the occurrence of a failure based on the output signals thereof, and providing the driving control of said electric motor as shifting the driving control, based on results of the determination, between a torque control mode using a detected value of said torque and a steering angle control mode using a detected value of either one of the rotational angles of said first and second rotary shafts; and wherein said controller comprises a plurality of processors for calculating the respective rotational angles of said first and second rotary shafts and said torque based on a predetermined operation equation using the output signals from said first and second rotation detection sections, and wherein said controller compares the corresponding rotational angles with each other and the corresponding torques with each other, the rotational angles and torques calculated by each of the processors, and selectively carries out either said torque control mode or said steering angle control mode according to comparison results.

5. An electric power steering system according to claim 1, wherein said controller comprises a plurality of processors for calculating the respective rotational angles of said first and second rotary shafts and said torque based on a predetermined operation equation using the output signals from said first and second rotation detection sections, and wherein said controller compares the corresponding rotational angles with each other and the corresponding torques with each other, the rotational angles and torques calculated by each of the processors, and selectively carries out either said torque control mode or said steering angle control mode according to comparison results.

6. An electric power steering system according to claim 2, wherein said controller comprises a plurality of processors for calculating the respective rotational angles of said first and second rotary shafts and said torque based on a predetermined operation equation using the output signals from said first and second rotation detection sections, and wherein said controller compares the corresponding rotational angles with each other and the corresponding torques with each other, the rotational angles and torques calculated by each of the processors, and selectively carries out either said torque control mode or said steering angle control mode according to comparison results.

7. An electric power steering system according to claim 4, wherein said plurality of the processors individually calculating the corresponding rotational angles and the corresponding torques using individually different operation equations.

8. An electric power steering system according to claim 5, wherein said plurality of the processors individually calculating the corresponding rotational angles and the corresponding torques using individually different operation equations.

9. An electric power steering system according to claim 6, wherein said plurality of the processors individually calculating the corresponding rotational angles and the corresponding torques using individually different operation equations.

* * * * *